(12) United States Patent
Weissman

(10) Patent No.: US 8,456,745 B2
(45) Date of Patent: Jun. 4, 2013

(54) COMPACT EYEPIECE USING AN IMERSED FIELD LENS

(75) Inventor: Paul Weissman, Brewster, NY (US)

(73) Assignee: Jill Weissman, Brewster, NY (US)

( * ) Notice: Subject to any disclaimer, the term of this patent is extended or adjusted under 35 U.S.C. 154(b) by 82 days.

(21) Appl. No.: 13/106,819

(22) Filed: May 12, 2011

(65) Prior Publication Data

US 2012/0134030 A1    May 31, 2012

Related U.S. Application Data

(60) Provisional application No. 61/334,052, filed on May 12, 2010.

(51) Int. Cl.
  *G02B 27/14*   (2006.01)
  *G02B 17/00*   (2006.01)
(52) U.S. Cl.
  USPC .......................................... 359/631; 359/727
(58) Field of Classification Search
  USPC ...................... 359/629–631, 643, 727, 802
  See application file for complete search history.

(56) References Cited

U.S. PATENT DOCUMENTS

| | | | |
|---|---|---|---|
| 3,443,858 | A | 5/1969 | LaRussa |
| 4,322,135 | A | 3/1982 | Freeman |
| 5,596,451 | A | 1/1997 | Handschy et al. |
| 6,853,491 | B1 | 2/2005 | Ruhle et al. |
| 8,094,377 | B2 | 1/2012 | Kessler et al. |
| 2007/0070508 | A1 * | 3/2007 | Ruhle et al. .................. 359/630 |

* cited by examiner

*Primary Examiner* — William Choi
(74) *Attorney, Agent, or Firm* — Gerow D. Brill

(57) ABSTRACT

A first embodiment is a lens system having a plurality of refractive and reflective spherical elements that work as a magnifier to produce a distortion free, less than 1%, image with optical correction over a wide field of view. The system has at least one concave reflecting surface, and at least three convex refracting surfaces with the sign of the radius of one of the convex refracting surfaces being opposite of the sign of the radius of remaining two convex refracting surfaces. A second embodiment is a lens having a concave reflecting element which is on a substrate that is a negative lens by transmission with an index of refraction between $1.6 < nd > 2.0$ and a dispersion $49 < vd > 15$. This is used in combination with at least 3 positive refracting surfaces with less dispersive power than the negative element and with the sign of the radius of one of the positive elements being opposite from the sign of the radius of the remaining positive elements.

19 Claims, 12 Drawing Sheets

COMPACT EYEPIECE USING AN IMERSED FIELD LENS

CROSS REFERENCE TO RELATED APPLICATIONS

This application is related to U.S. Ser. No. 61/334,052 filed on May 12, 2010 entitled "Compact Eyepiece Using an Immersed Field Lens" by Paul Weissman and hereby incorporated herein by reference.

FIELD OF INVENTION

The present invention generally relates to head mounted display systems for viewing electronically generated images that are projected as a virtual image and more particularly relates to using a compact eyepiece with an immersed field lens.

BACKGROUND

There is a general need for eyepieces and viewing devices. A sector of these viewing devices finds their way into the field of head-borne (helmet-mounted) displays. When used as head borne displays an important consideration is size and weight. Reduction of the size and weight are at a premium and often other requirements are relaxed. Relaxed requirements can be optical performance at the edge of the field or distortion. However it is desirable to have low weight and small size with high optical performance and low distortion. It is the purpose of this invention to satisfy these needs by providing a compact size, low weight, excellent optical performance and distortion correction. These devices are generally used in conjunction with miniature displays. A miniature display may be a CRT or an LCD or an AMOLED or an electroluminescent device as well as other devices. All of these devices have a focal plane upon which information is displayed. The information which is displayed is generally immersed in a medium such as glass or a liquid crystal material. For example the phosphor of a CRT is generally immersed behind a glass faceplate or fiber optic faceplate, while the active area of an LCD is immersed in LC material followed by a polarizer and glass cover plate and an AMOLED phosphor is usually immersed in a potting compound and a glass cover plate.

Since the early years of head-borne displays, the importance of the spherical minor, in various forms, has been a useful tool due to the many positive optical properties associated with the concave spherical element. This concept was developed for wide field cameras used for astronomical purposes. The concept of the concentric system was used by Bernhard Schmidt (1879-1935) in "A Rapid Coma-free Mirror System" (*Amateur Telescope Making, Vol.* 3, Scientific American Publishing Co., New York, 1953). The concept of concentricity was explored in depth by A. Bouwers in *Achievements in Optics* (Elsevier Publishing Company Inc. 1950). The concept is: a concave spherical mirror with the aperture stop placed at the center of curvature, using a curved focal plane with a radius of ½ that of the mirror, placed equally between the aperture stop and the minor will yield "0" for Seidel aberration coefficients except spherical aberration and field curvature. To solve for spherical aberration, a corrector is placed at the aperture stop. To solve for field curvature, the image surface is curved. The curvature of the image surface changes the intercept points of the principal rays. The principal rays now fall at a height closer to the axis at the image plane. The lower height intercept results in a distorted image, as seen on the image plane. The above systems focus collimated light on an image plane. Geometric optics being reversible, objects at the image plane exit the aperture stop collimated. Systems used in reverse can be thought of as collimators, and due to the wide fields of view possible, these devices have found use in simulators, although with slight variations. Because these systems can have fields of view larger than 180°, the normal distortion equation using the tangent is inadequate. Since the 1960s, the term 'mapping' has replaced distortion. For systems covering less than 180°, mapping can still be compared to distortion in the classic sense.

During the late 1980s, a course was given by Philip Rogers (Two-Eye Visual Systems) followed by a shorter publication (Two-Eyed Optical Devices) Optics and Photonics News Vol 12, issue 7, pgs 24-27, 2001, showing many variations a spherical mirror concept to eyepieces. FIG. 1 illustrates a schematic representation of an optical apparatus for binocular viewing. This figure is from U.S. Pat. No. 4,322,135 ('135) and the '135 patent is hereby incorporated in full by reference. Several important concepts are put forth in the '135 patent including the object generated by (1) forming an image on (2) a convex fiber optic faceplate. The light passes through 5 and is reflected by 7 and 8 to a concave reflecting Surface 3 (numbers from the '135 patent. After reflection by 3 the light is transmitted through 7 and 10 and is incident on the eye, where it is perceived as an image. A relevant part of this invention is a fiber optic faceplate with a phosphor on the inner side which transforms the image plane from a flat to convex. object surface. This flat to convex transformation is required for correcting the curved field caused by the concave reflecting surface.

FIG. 2 illustrates (1) a CRT with a convex fiber optic faceplate used in conjunction with a (2) beam-splitter cube and 3 a semi-transparent concave mirror used to form a collimated image to (4) the eye. MSOD, White Plains, N.Y. sold several of these units to General Electric (Williams AFB) in 1990. The relevant part is the use of a curved surface (in this instance a fiber optic faceplate, in conjunction with a beam-splitter cube eyepiece and a concave reflector to form a head-borne display.

FIG. 3 illustrates FIG. 2 from U.S. Pat. No. 5,596,433 ('433) hereby incorporated herein in full by reference, which teaches how distortion can be corrected with the use of aspheric surfaces. In this design $(r_{11})$ is used to correct for distortion caused primarily by (R). The relevant part is a distortion corrected beam-splitter cube eyepiece through the use of aspheric optical surfaces.

FIG. 4 is from U.S. Pat. No. 5,596,451 ('451), hereby incorporated herein in full by reference, illustrates a CRT in combination with a polarizing beam splitter cube, a ¼ wave plate, and curved reflectors that are used to increase the transmission of the devices shown in FIG. 2. The relevant part is the manipulation of polarized light by using ¼ wave plate(s) to rotate the plane of polarization thereby using a trans-reflecting polarizing surface within the cube to improve system transmission.

FIG. 5 is from U.S. Pat. No. 3,443,858 ('858), hereby incorporated herein in full by reference, and illustrates a method of making a compact collimating optical system by selective use of polarized light. The relevant part is the compacting of a device, such as a spherical mirror/beam splitter, to form a smaller length.

The attributes of the prior art can be arranged to form variations. The aspheric surfaces of FIG. 3 can be combined with FIG. 4 to produce a reduced distortion version of FIG. 4. A convex fiber optic screen can be used with FIG. 3 to correct for field curvature thus requiring flatter aspheric surfaces. The CRT phosphor shown in FIG. 2 can be replaced with another phosphor such as an OLED phosphor or an electroluminescent phosphor. However, no combination of the examples allows for the correction of distortion on a flat plane using spherical surfaces.

However, it is possible to combine the above technologies to produce an eyepiece, such as a cube eyepiece, as shown in FIG. 2, to form a distortion free image if a fiber optic faceplate is used. The concept of using a fiber optic plate which is plano on the phosphor side and in contact with an OLED phosphor and a convex opposite side combined with a cube eyepiece was demonstrated to NVIS Inc. Reston, Va. prior to this application with regard to using this concept in an Army SBIR proposal A04-222, now Contract W91 RB08C 0151. FIG. 6 illustrates the optical arrangement of this device. FIG. 7 illustrates the astigmatism and distortion for a centered pupil. FIG. 8 illustrates the quotation for the convex fiber optic faceplate with material specified by eMagin. However this work was done by the assignee in 2006. This work was produced by the assignee as a partner with NVIS in an SBIR proposal and is included herein as prior art.

BRIEF DESCRIPTION OF THE DRAWINGS

These and other features, aspects and advantages of the present invention will become better understood with regard to the following description, appended claims and accompanying drawings where:

SUMMARY OF THE INVENTION

Figure 1:
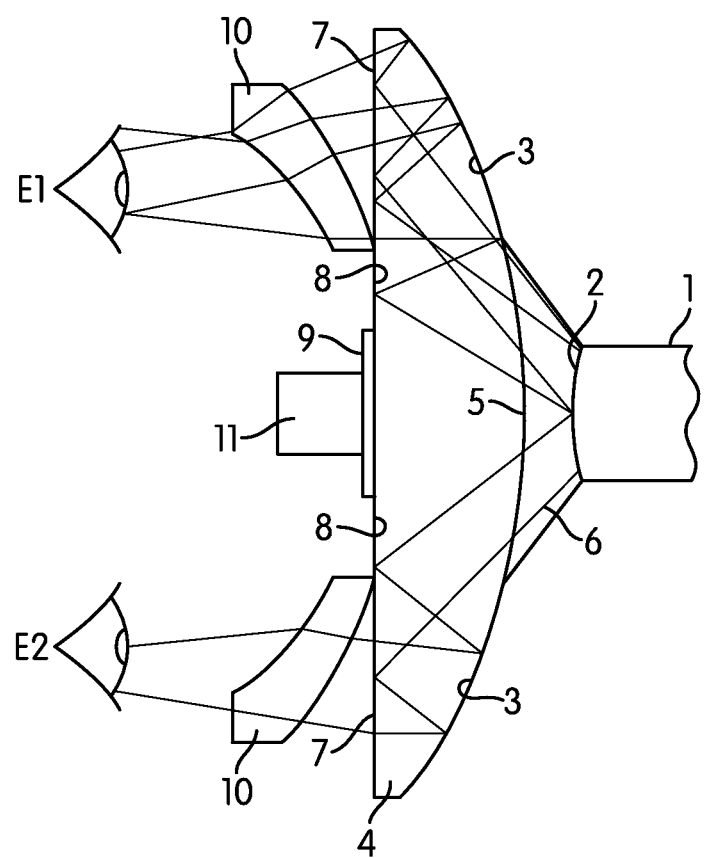
FIG. 1 illustrates a schematic representation of an optical apparatus for binocular viewing from U.S. Pat. No. 4,322,135 ('135)
Figure 2:
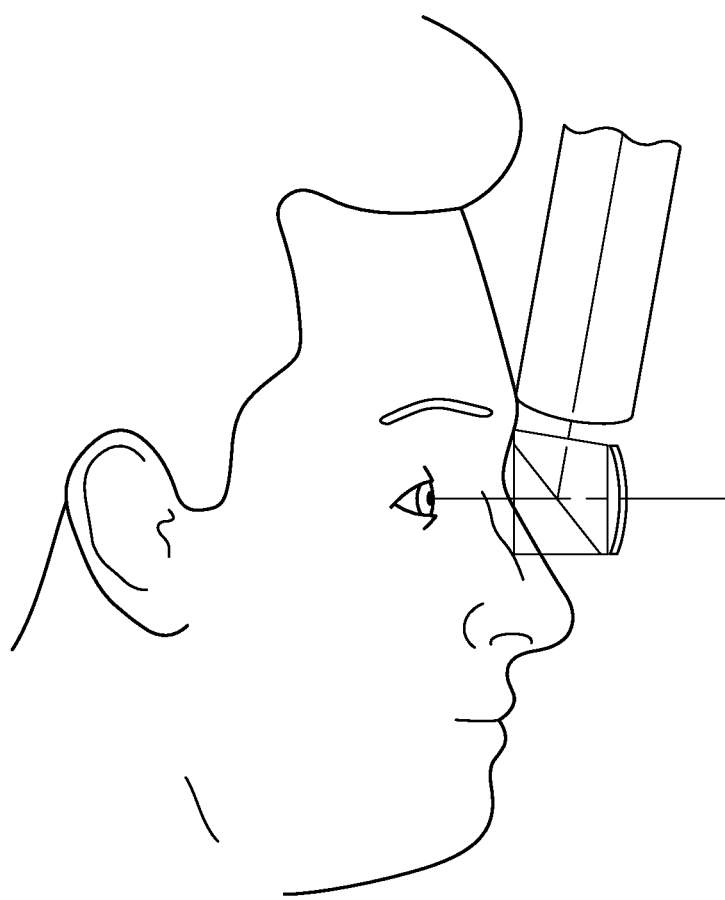
FIG. 2 illustrates (1) a CRT with a convex fiber optic faceplate used in conjunction with a (2) beam-splitter cube and 3 a semi-transparent concave mirror used to form a collimated image to (4) the eye [sold to General Electric in 1991]
Figure 3:
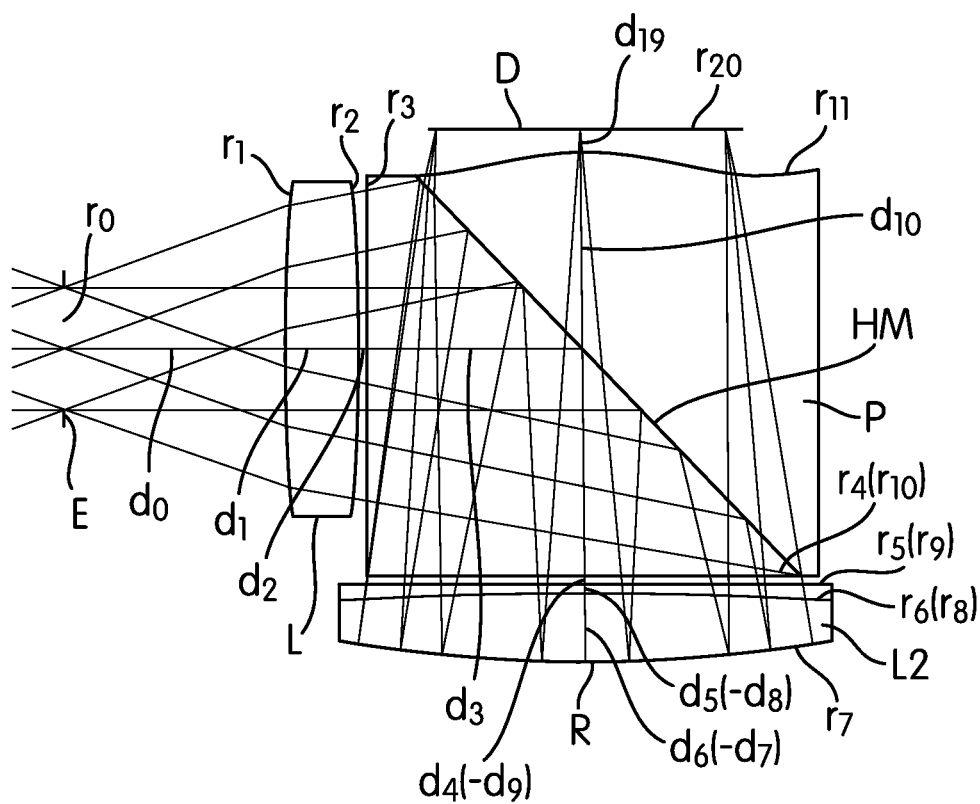
FIG. 3 illustrates FIG. 2 from U.S. Pat. No. 5,596,433 ('433) which teaches how distortion can be corrected with the use of aspheric surfaces.
Figure 4:
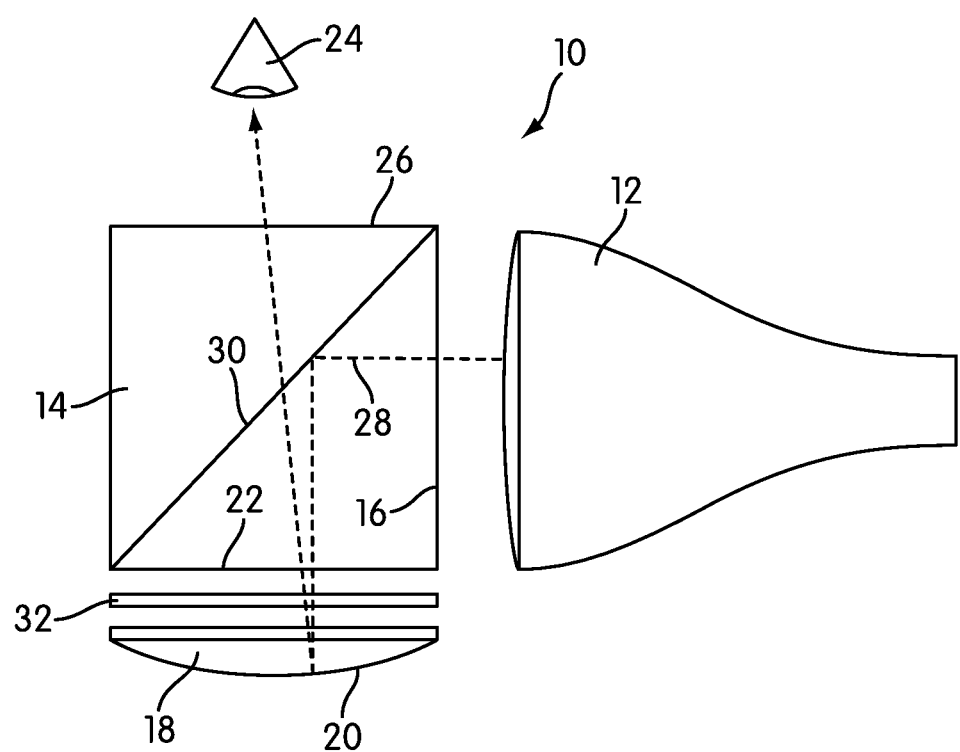
FIG. 4 from U.S. Pat. No. 5,596,451 illustrates how a CRT in combination with a polarizing beam-splitter cube, a ¼ wave plate, and a curved reflector are used to increase the transmission of the devices shown in FIG. 2.
Figure 5:
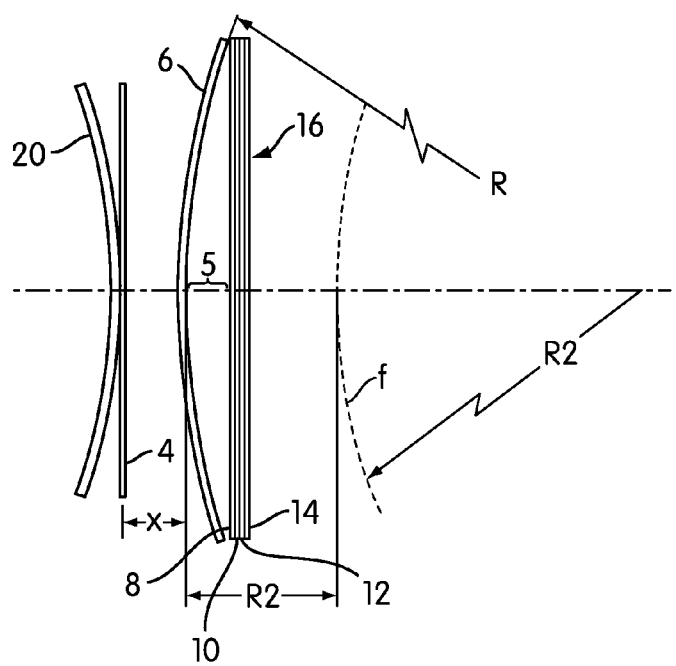
FIG. 5 from FIG. 2 of U.S. Pat. No. 3,443,858 illustrates a compact viewer which forms a distorted image using a curved object surface.
Figure 6:
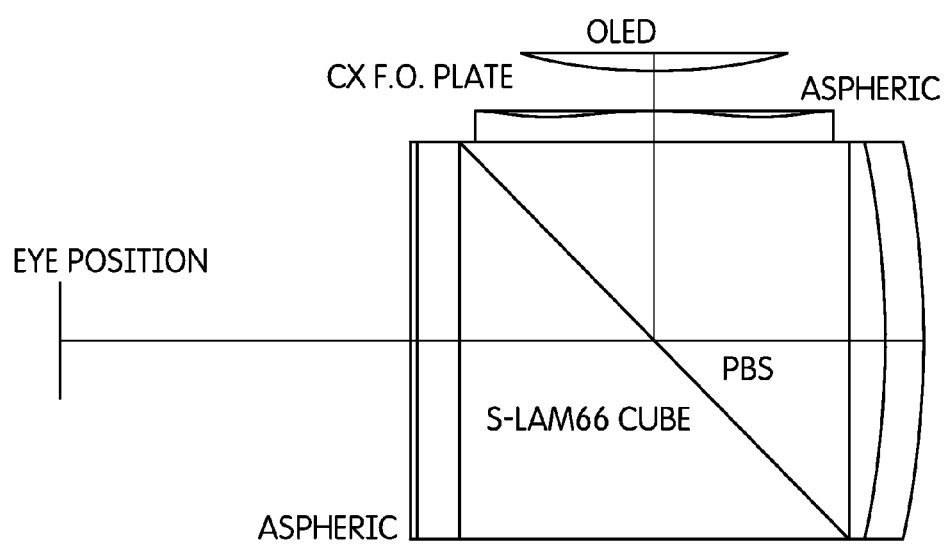
FIG. 6 illustrates a cube eyepiece using a curves fiber optic faceplate to correct for field curvature and aspheric surfaces to correct distortion.

A first embodiment is a lens system having a plurality of refractive and reflective spherical elements that work as a magnifier to produce a distortion free, less than 1%, image with optical correction over a wide field of view. The system has at least one concave reflecting surface, and at least three convex refracting surfaces with the sign of the radius of one of the convex refracting surfaces being opposite of the sign of the radius of remaining two convex refracting surfaces.

A second embodiment is a lens having a concave reflecting element which is on a substrate that is a negative lens by transmission with an index of refraction between $1.6<nd<2.0$ and a dispersion $15<vd<50$. This is used in combination with at least 3 positive refracting surfaces with less dispersive power than the negative element and with the sign of the radius of one of the positive elements being opposite from the sign of the radius of the remaining positive elements.

With regard to distortion, it is important to note that if (h) is the height; in an image plane; and (F) is the effective focal length of the optic, then the new invention uses a series of spherical reflecting and refracting optically active surfaces arranged to produce a mapping that matches $h=F \tan \Theta$. This means the system is free of distortion in the classic sense. Because most image generators, cameras and other optical devices used to gather and view information are also designed to produce $h=F \tan \Theta$ images, it is desirable to match this mapping in other visual systems.

In each embodiment one of the convex elements is immersed in contact with an image source and is generally a field lens.

DETAILED DESCRIPTION

The disclosure herein describes a compact eyepiece using an immersed field lens. The device described has a series of reflecting and refracting surfaces which are used to view a small object source such as an LCD, OLED, or EL device. The device is an arrangement of optical surfaces such that a solution can be found for the correction of optical aberrations which can produce a compact optical magnifier using a flat input surface and having mapping approximately equal (<1% over 60°) to $h=F \tan \Theta$.

With regard to distortion, it is important to note that if (h) is the height in an image plane; and (F) is the effective focal length of the optic, then the new invention uses a series of spherical reflecting and refracting optically active surfaces arranged to produce a mapping that matches $h=F \tan \Theta$. This means the system is free of distortion in the classic sense. Because most image generators, cameras and other optical devices used to gather and view information are also designed to produce $h=F \tan \Theta$ images, it is desirable to match this mapping in other visual systems.

The device described herein uses an immersed field lens for large fields of view. For smaller fields of view the field lens can be detached from the image plane.

Additionally, surfaces indicated in the table, text, and claims, may be taken to be partially reflecting and partially transmitting surfaces which include beam-splitting surfaces and polarizing beam-splitters, all of which are well known to those versed in the art.

In the following description of figures the radii will bound thicknesses of materials with indices of refraction that are not equal to 1. These for lens elements. Lens elements are considered positive when they cause collimated light to converge to form a real image. Negative lens elements will cause collimated light to diverge forming a virtual image. These conventions are well known to those versed in the art.

Explanation of the Figures

Figure 9A:
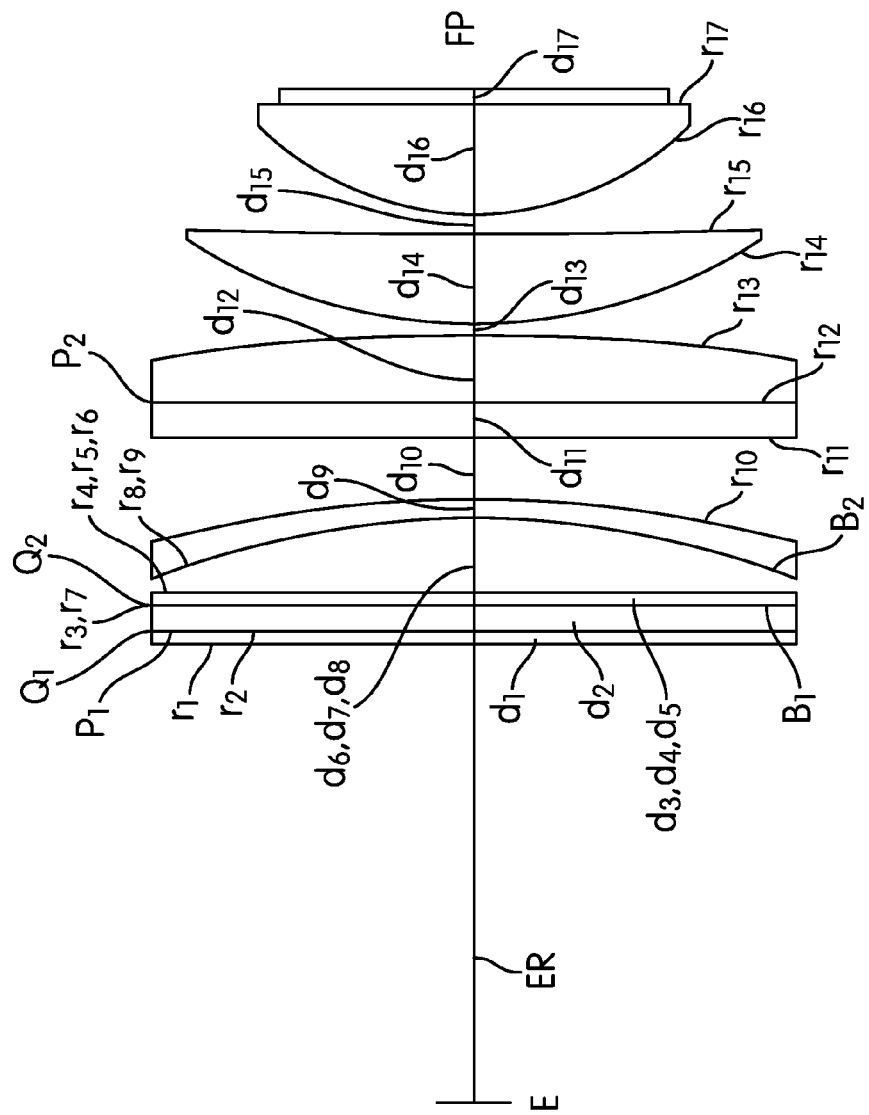
FIG. 9a illustrates the optical arrangement of an exemplary embodiment device disclosed using the concave reflecting surface substrate to correct for color and associated with Table 1 and Table 2.
Figure 9B:
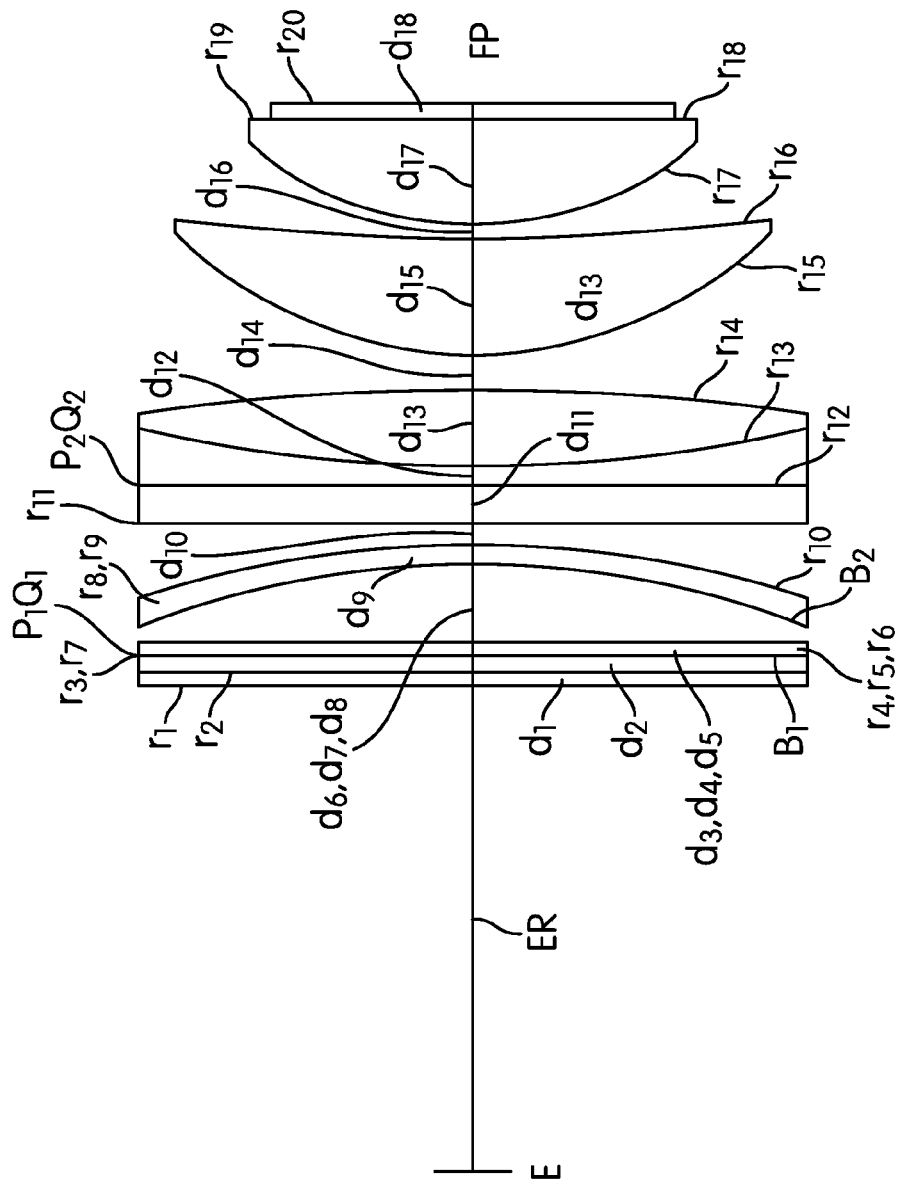
FIG. 9b illustrates the device with color correction implemented by changing a convex refracting lens to a color correcting doublet and is associated with table 3

Referring to FIGS. 9a and 9b: The symbols will be explained below in the order of reversed ray tracing. Reverse ray tracing means tracing from the eye to the object surface. (E) denotes the eye position. (ER) is the eye relief. (FP) denotes the focal plane, an image forming device such as an OLED or LCD or others. (B) denotes a beam splitter surface which can be a polarizing or non-polarizing beamsplitter. (P) indicates a polarizer such as a absorptive sheet polarizer. (Q) indicates a ¼ wave plate, or retarder, which can be a stretched polymer or mica or other bi-axial material(s)

In Examples 1 through 3, the angle of view is +/−30° in the diagonal direction yielding a total field of view of 60° in the diagonal. The effective focal length is 10. The viewing area has a diameter of 3. Examples 1 and 2 are illustrated in FIG. 9a while Example 3 is illustrated in FIG. 9b.

The lens data given below is in reversed order. The symbols are as follows: (E) is the viewing position; (ER) is the eye relief or distance from the eye pupil to the first lens surface; ($r_1, r_2 \ldots$) are the radii of curvature of the transmissive, reflective or refractive surfaces; ($d_1, d_2 \ldots$) are the spacings between the adjacent surfaces; ($n_1, n_2 \ldots$) are the refractive indices of the material at the yellow helium spectral line d, (587 nm); ($v_1, v_2 \ldots$) indicates the dispersion of the material as the Abbe number vd ($V_d = (n_d-1)/(n_F-n_c)$) where F=blue hydrogen line (486 nm) and C=red hydrogen line (656 nm). A reflecting surface is taken to be a partially reflecting surface or beam-splitter of which many types may be substituted and can be noted by the sign change in $d_N$ A literal description of the light path through FIGS. 9a and 9b is given. Two different patents are included to show the versatility of the device.

Referring to FIG. 9a a ray of light shall be traced in reverse for use with U.S. Pat. No. 3,443,858 from (E) to (FP). Starting at (E) light travels to ($r_1$), passes through ($d_1$) and encounters linear polarizer ($P_1$). A portion of the light passes through ($P_1$) and is incident on ($Q_1$) which is a ¼ wave plate oriented with its fast axis rotated 45° clockwise with regard to the polarization axis of ($P_1$). The light passes through ($Q_1$) and is incident on ($r_2$) passing through ($r_2$) and ($d_2$) and is then incident on ($r_3$) then ($B_1$) which is a beam-splitter surface. A portion of the light passes through ($B_1$) and encounters ¼ wave plate ($Q_2$) with its fast axis rotated 45° counter clockwise with regard to the polarization axis of ($P_1$) and then continues through ($d_3$) exiting through ($r_4$). The light then traverses ($d_4$) encounters ($B_2$) which is a beam-splitter coating on ($r_5$). A portion of the light is reflected to ($d_5$) and enters $r_6$ passes through ($Q_2$) a second time and encounters ($B_1$) beam-splitter on surface ($r_7$). A portion of the light is reflected by ($B_1$) and traverses ($d_7$) exits ($r_8$) then traverses ($d_8$). The light is incident on ($B_2$) and a portion passes through and enters ($r_9$), passes through ($d_9$) then exits through ($r_{10}$). Traversing ($d_{10}$) light then travels to ($r_{11}$) passes through ($d_{11}$) and encounters ($P_2$), polarizer with the polarization axis oriented 90° with regard to the axis of ($P_1$). A portion passes through and enters ($d_{12}$) exiting through ($r_{13}$). The light then traverses ($d_{13}$) encounters ($r_{14}$) passes through ($d_{14}$) exits through ($r_{15}$) traverses ($d_{15}$) encounters ($r_{16}$) travels through ($d_{16}$), immersed ($r_{17}$) and ($d_{17}$) and comes to focus at the immersed focal plane (FP). Similar light paths will occur with alternate patents such as U.S. Pat. No. 6,853,491 which have alternate arrangements of polarizers and ¼ wave plates. Additionally, if the source at (FP) is polarized, such as an LCD, then polarizer ($P_2$) may be omitted.

Referring to FIG. 9b, the device is arranged to work with U.S. Pat. No. 6,853,491 ('491) hereby incorporated herein in full by reference. Light travels from (E) and is incident on ($r_1$) passes through ($r_1$),($d_1$),($d_2$) and is incident on transmissive/reflective polarizing beam splitter ($B_1P_1$). A portion of the light passes through and is incident on ($Q_1$) ¼ wave plate with the fast axis rotated 45° clockwise with respect to the polarization axis of ($P_1B_1$). Light passes through ($Q_1$) passes through ($d_3$) and exits through ($r_4$) then traverses ($d_4$) and is incident on ($B_2$) a beam-splitter on surface ($r_5$). A portion of the light traverses ($d_5$) passes through ($r_6$) and ($Q_1$) a second time and is incident on ($P_1B_1$). A portion is reflected by ($P_1$%) passing through ($d_7$) exiting through ($r_8$) traversing ($d_8$) and is incident on ($B_2$). A portion of the light passes through ($B_2$), ($r_9$) and travels through ($d_9$) exiting through ($r_{10}$) after which the light traverses ($d_{10}$) then passes through ($d_{11}$) encountering ($Q_2$) ¼ wave plate orientated with its fast axis rotated at 45° counter clockwise with respect to the polarization axis of ($P_1B_1$). The light passes through ($Q_2$) and is incident on ($P_2$) polarizer with its axis rotated 90° with respect to ($P_1$). A portion of the light passes through ($P_2$) then ($r_{12}$), ($d_{12}$), ($r_{13}$), ($d_{13}$) and exits ($r_{14}$), after which it traverses ($d_{14}$) entering ($r_{15}$) passing through ($d_{15}$) and exiting ($r_{16}$). The light then traverses ($d_{16}$) entering ($r_{17}$) and passes through ($d_{17}$), ($r_{18}$), ($r_{19}$),($d_{18}$) where the immersed focal plane is intersected at (FP).

Example 1 illustrates a device calculated to produce reduced third order Seidel aberration coefficients:

TABLE 1

Example 1

| | | | |
|---|---|---|---|
| $r_0$ = infinity | $d_0$ = infinity | | |
| E = infinity | ER = 14.28 | | |
| $r_1$ = infinity | $d_1$ = 0.40 | $n_1$ = 1.51680 | $v_1$ = 64.17 |
| $r_2$ = infinity | $d_2$ = 0.80 | $n_2$ = 1.51680 | $v_2$ = 64.17 |
| $r_3$ = infinity | $d_3$ = 0.04 | $n_3$ = 1.51680 | $v_3$ = 64.17 |
| $r_4$ = infinity | $d_4$ = 1.89 | | |
| $r_5$ = −28.95 | $d_5$ = −1.89 | REFLECTOR | |
| $r_6$ = infinity | $d_6$ = −0.40 | $n_6$ = 1.51680 | $v_6$ = 64.17 |
| $r_7$ = infinity | $d_7$ = 0.40 | REFLECTOR | |
| $r_8$ = infinity | $d_8$ = 1.89 | | |
| $r_9$ = −28.95 | $d_9$ = 1.00 | $n_9$ = 1.80518 | $v_9$ = 25.43 |
| $r_{10}$ = −38.83 | $d_{10}$ = 1.87 | | |
| $r_{11}$ = infinity | $d_{11}$ = 1.14 | $n_{11}$ = 1.51680 | $v_{11}$ = 64.17 |
| $r_{12}$ = infinity | $d_{12}$ = 2.14 | $n_{12}$ = 1.53995 | $v_{12}$ = 63.77 |
| $r_{13}$ = −61.67 | $d_{13}$ = 0.31 | | |
| $r_{14}$ = 17.96 | $d_{14}$ = 2.74 | $n_{14}$ = 1.60973 | $v_{14}$ = 52.82 |
| $r_{15}$ = 253.95 | $d_{15}$ = 0.65 | | |
| $r_{16}$ = 10.14 | $d_{16}$ = 3.43 | $n_{16}$ = 1.69097 | $v_{16}$ = 52.82 |
| $r_{17}$ = infinity | $d_{17}$ = 0.44 | $n_{17}$ = 1.51680 | $v_{17}$ = 64.17 |

Seidel third order Coefficients

| Spherical | Coma | Astigmatism | Petzval | Distortion |
|---|---|---|---|---|
| 0.00005 | 0.00000 | 0.00000 | 0.00000 | 0.00000 |

TABLE 2

Example 2

| | | | |
|---|---|---|---|
| $r_0$ = infinity | $d_0$ = infinity | | |
| E = infinity | ER = 14.28 | | |
| $r_1$ = infinity | $d_1$ = 0.40 | $n_1$ = 1.51680 | $v_1$ = 64.17 |

TABLE 2-continued

Example 2

| | | | |
|---|---|---|---|
| $r_2$ = infinity | $d_2$ = 0.80 | $n_2$ = 1.51680 | $v_2$ = 64.17 |
| $r_3$ = infinity | $d_3$ = 0.04 | $n_3$ = 1.51680 | $v_3$ = 64.17 |
| $r_4$ = infinity | $d_4$ = 1.86 | | |
| $r_5$ = −29.454 | $d_5$ = −1.86 | REFLECTOR | |
| $r_6$ = infinity | $d_6$ = −0.40 | $n_6$ = 1.51680 | $v_6$ = 64.17 |
| $r_7$ = infinity | $d_7$ = 0.40 | REFLECTOR | |
| $r_8$ = infinity | $d_8$ = 1.86 | | |
| $r_9$ = −29.454 | $d_9$ = 1.00 | $n_9$ = 1.80518 | $v_9$ = 25.43 |
| $r_{10}$ = −51.374 | $d_{10}$ = 0.57 | | |
| $r_{11}$ = infinity | $d_{11}$ = 1.14 | $n_{11}$ = 1.51680 | $v_{11}$ = 64.17 |
| $r_{12}$ = infinity | $d_{12}$ = 2.14 | $n_{12}$ = 1.51680 | $v_{12}$ = 64.17 |
| $r_{13}$ = −35.263 | $d_{13}$ = 1.79 | | |
| $r_{14}$ = 14.098 | $d_{14}$ = 3.37 | $n_{14}$ = 1.72916 | $v_{14}$ = 54.68 |
| $r_{15}$ = 70.996 | $d_{15}$ = 0.28 | | |
| $r_{16}$ = 10.48 | $d_{16}$ = 3.13 | $n_{16}$ = 1.72196 | $v_{16}$ = 54.68 |
| $r_{17}$ = infinity | $d_{17}$ = 0.44 | $n_{17}$ = 1.51680 | $v_{17}$ = 64.17 |

TABLE 3

Example 3

| | | | |
|---|---|---|---|
| $r_0$ = infinity | $d_0$ = infinity | | |
| E = infinity | ER = 14.28 | | |
| $r_1$ = infinity | $d_1$ = 0.40 | $n_1$ = 1.51680 | $v_1$ = 64.17 |
| $r_2$ = infinity | $d_2$ = 0.80 | $n_2$ = 1.51680 | $v_2$ = 64.17 |
| $r_3$ = infinity | $d_3$ = 0.04 | $n_3$ = 1.51680 | $v_3$ = 64.17 |
| $r_4$ = infinity | $d_4$ = 1.86 | | |
| $r_5$ = −29.29 | $d_5$ = −1.86 | REFLECTOR | |
| $r_6$ = infinity | $d_6$ = −0.40 | $n_6$ = 1.51680 | $v_6$ = 64.17 |
| $r_7$ = infinity | $d_7$ = 0.40 | REFLECTOR | |
| $r_8$ = infinity | $d_8$ = 1.86 | | |
| $r_9$ = −29.29 | $d_9$ = 1.00 | $n_9$ = 1.51680 | $v_9$ = 64.17 |
| $r_{10}$ = −34.07 | $d_{10}$ = 0.57 | | |
| $r_{11}$ = infinity | $d_{11}$ = 1.14 | $n_{11}$ = 1.51680 | $v_{11}$ = 64.17 |
| $r_{12}$ = infinity | $d_{12}$ = 0.57 | $n_{12}$ = 1.80518 | $v_{12}$ = 25.43 |
| $r_{13}$ = 45.88 | $d_{13}$ = 2.29 | $n_{13}$ = 1.51680 | $v_{13}$ = 64.17 |
| $r_{14}$ = −73.98 | $d_{14}$ = 1.04 | | |
| $r_{15}$ = 13.61 | $d_{15}$ = 3.37 | $n_{15}$ = 1.72916 | $v_{15}$ = 54.68 |
| $r_{16}$ = 75.47 | $d_{16}$ = 0.38 | | |
| $r_{17}$ = 10.94 | $d_{17}$ = 3.12 | $n_{17}$ = 1.81600 | $v_{17}$ = 46.6 |
| $r_{18}$ = infinity | $d_{18}$ = 0.43 | $n_{18}$ = 1.51680 | $v_{18}$ = 64.17 |

Example 1 illustrates that there is a possibility that the system can be corrected due to the balancing of the aberration coefficients when the contribution from each surface is summed. The third order correction for this system indicates the shapes and directions the radii are drawn from which may produce excellent optical correction. The basic condition is a concave reflector which is later followed by a concave refracting surface followed by a convex refracting surface. These constitute the contributions of the element that acts as a reflector and concave lens. This element also contributes to the color correction for the remainder of the system. Three positive elements follow; one with the radius drawn from the left and the other two with the radius drawn from the right. This arrangement is balanced for the correction of distortion to h=F tan Θ.

Example 2 is similar to Example 1 however the system departs from zeroing the third order coefficients in favor of balancing the third order aberrations with higher order aberrations. This system benefits from a concave reflector substrate with a high index of refraction and a numerically low dispersion. The mirror substrate can then be used to color correct the system.

Example 3 illustrates how the color correction can be moved to other lenses in the system. In this example the substrate of the concave reflector has a low index of refraction and a numerically high dispersion. The general shape of the elements remains the same with one of the convex refractive radii being drawn from the left while the following two convex refracting radii drawn from the right. A slightly better color correction and slightly better monochromatic correction can be achieved by achromatizing the individual elements. The design can also slightly improve by changing the curvature of $r_1$. When used with smaller fields of view (ie. 40°) The convex element which is right most in FIGS. 9a and 9b can be separated from the imaging device and bent to find a solution.

Figure 7:
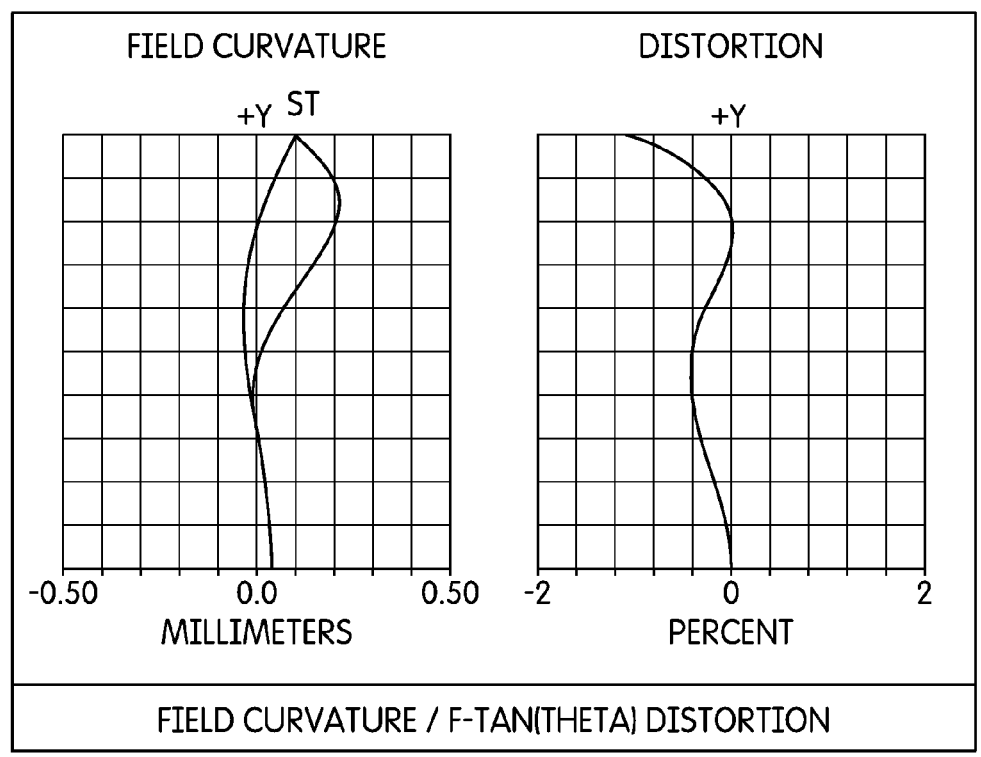
FIG. 7 illustrates the field curvature and distortion of the eyepiece illustrated in FIG. 6.
Figure 8:
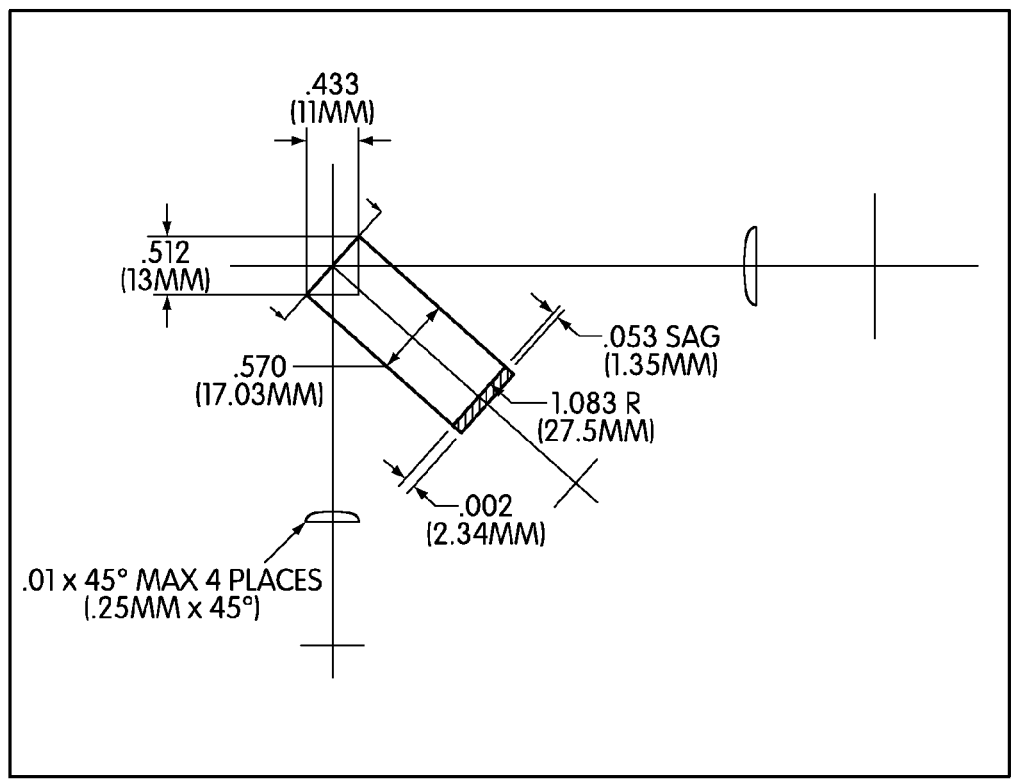
FIG. 8 shows the convex fiber optic faceplate design for the optic of FIG. 6
Figure 10:
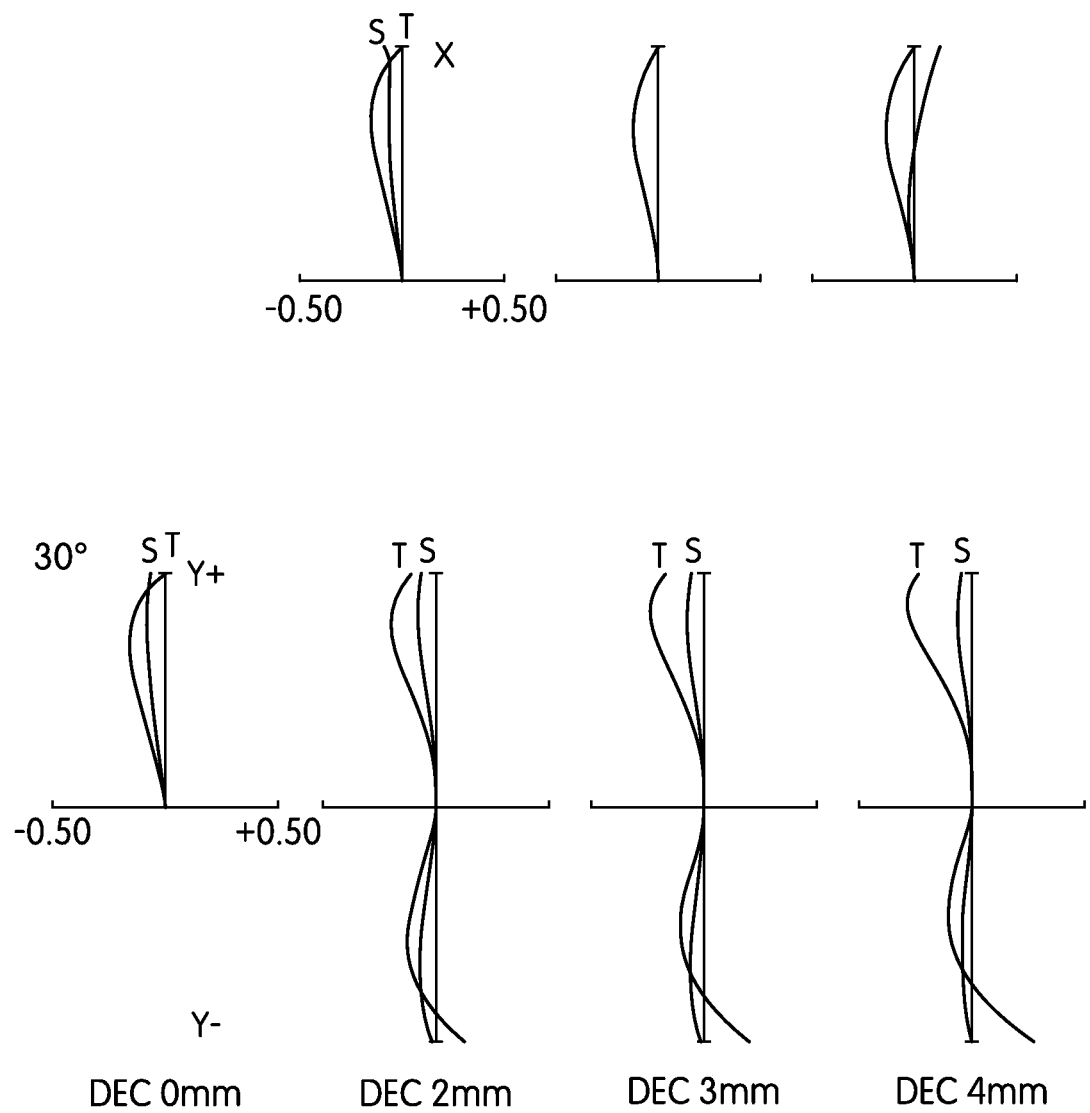
FIG. 10 illustrates the astigmatism for a centered and decentered eye pupil with respect to the optical axis of the eyepiece; with respect to the data in Table 2 scaled to work with an SXGA OLED (EFL 17.5 mm)
Figure 11:
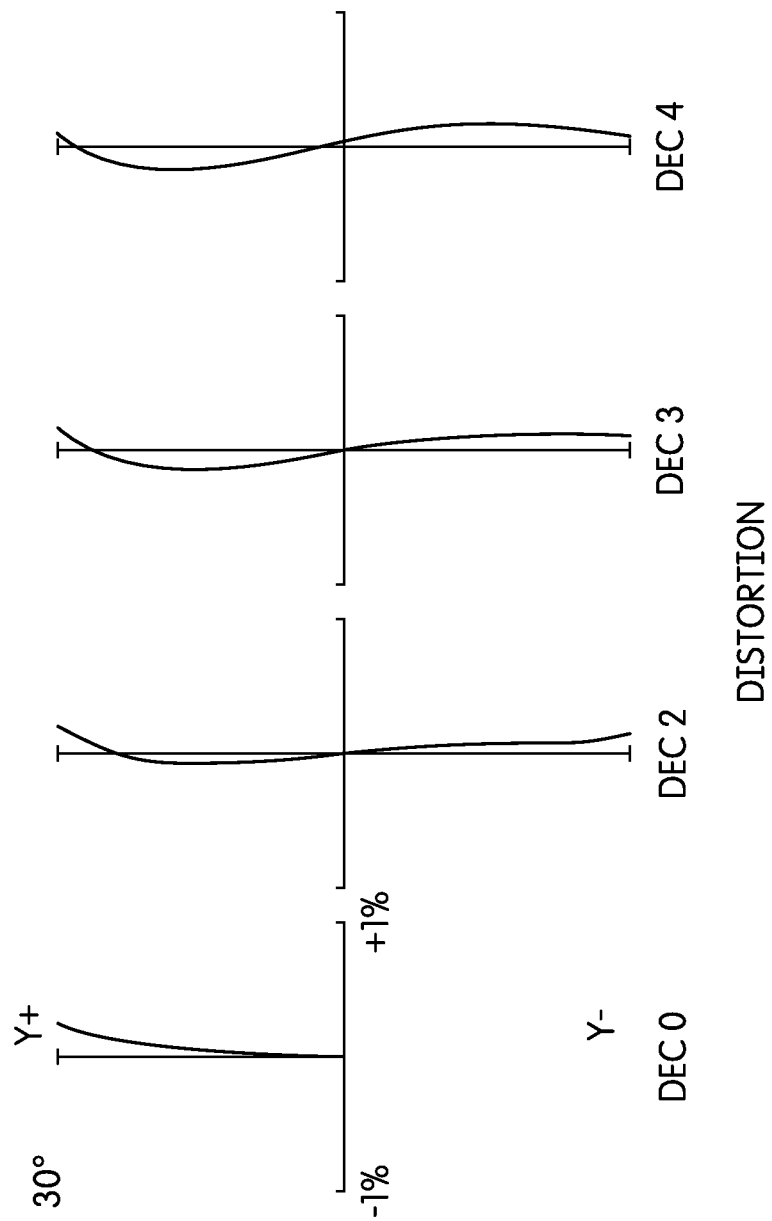
FIG. 11 illustrates the distortion for a centered and decentered eye pupil with respect to the optical axis of the eyepiece, with respect to the data in Table 2 scaled to work with an SXGA OLED (EFL 17.5 mm)
Figure 12:
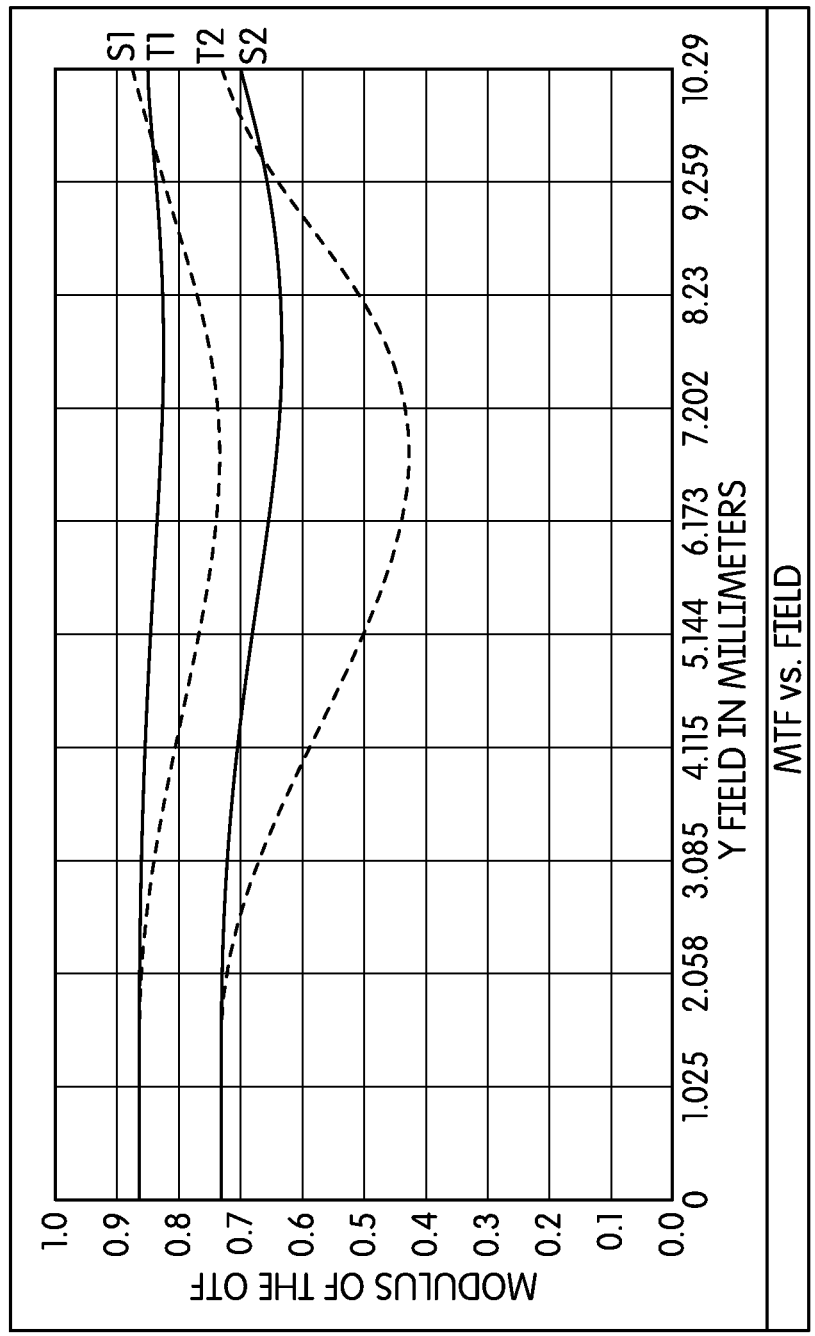
FIG. 12 illustrates the Modulation Transfer Function for a centered eye with respect to the data in Table 2 scaled to work with an SXGA OLED (EFL 17.5 mm) across a 60° FOV at a frequency of 12.8 and 25.6 LP/degree (1× and 2× the pixel density of the OLED device).

While it is necessary to portray an optical device in a theoretical way it can be more instructive to examine the device performance as applied to a situation which is currently possible with existing ancillary devices. While the examples are all scaled to an effective focal length of 10, in use the effective focal length will change. An example for use with a typical eMagin OLED with a resolution of 1280×1024 pixels will now be used to demonstrate the qualities of the devices herein. The data given in Example 2 is be scaled to produce an effective focal length of 17.5 mm. The lens system is reversed to form an afocal device and analyzed in Diopters for astigmatism, in percentage for distortion, and in line pairs per degree for performance. The wave length used in the analysis is 587 nm. For this type of system it is required to analyze performance with the eye centered and with the eye decentered with respect to the optical system axis because the eye can move with respect to the optical system. In this regard the eye will be de-centered up from the axis of the optical system. FIG. 7 illustrates the astigmatism for the up field (+Y) down field (−Y) and horizontal field (X). The full scale for all positions is +/−0.5 Diopters. From FIG. 10 it can be seen that the field is substantially flat and that the astigmatism is well controlled for both centered and decentered positions. FIG. 11 illustrates the distortion for the optical system. Full scale is +/−1%. The level of distortion correction based on h=F tan Θ is well under ½% for both centered and decentered positions. It is important to maintain the amount and the sign of the distortion for various decentered positions to avoid what is known as dynamic distortion, or more plainly referred to as "swimming", where the image appears [with eye movement] to move differentially based on field position. The display device when viewed through the disclosed magnifying eyepiece will have a field of view of approximately 50° in the horizontal (60°) in the diagonal) when used with the eMagin 1280×1024 OLED. The frequency per pixel pair is approximately 0.21 pixel pairs per minute. FIG. 12 illustrates the MTF across the field of view without re-focusing. The upper curves represent the sagittal and tangential performance at a frequency commensurate with the eMagin device while the lower curves represent the sagittal and tangential with a device that would have twice the pixel density in the same area as the eMagin device. This demonstrates that the device will work well at much higher frequencies as the technology of micro displays progresses.

As the compact magnifier has been described the device can produce a field of view of over 60° and have distortion (h=F tan Θ) not exceeding 1%. The device has been described with an arrangement incorporating the techniques described in the '858 patent and the '491 patent to allow for in line viewing of a magnified image of a source. However, many other systems would benefit from optical arrangement of this disclosure.

Although the compact optical magnifier has been as described above by way of some examples it should be noted that the compact magnifier is not limited to these examples and that various changes and modifications may be incorporated into the design.

All the features disclosed in specification (including any accompanying claims, abstract, and drawings) may be replaced by alternative features serving the same, equivalent or similar purpose, unless expressly stated otherwise. Thus unless states otherwise, each feature disclosed, each feature disclosed is one example of generic series of equivalent or similar features.

The follow patent and patent application references are hereby incorporated herein in full by reference.

U.S. Pat. No. 3,443,858
U.S. Pat. No. 4,322,135
U.S. Pat. No. 5,596,433
U.S. Pat. No. 5,596,451
U.S. Pat. No. 6,853,491
US Patent Application Publication 2010/0290127

I claim:

1. An optical magnifying eyepiece comprising:
a flat immersed object surface;
said eyepiece further comprising at least one concave reflecting surface;
and at least one negative lens element and
a plurality of positive lens elements having primarily convex refracting surfaces wherein a radii of said convex refracting surfaces are not all the same sign and said surfaces are axially combined sections of spheres; and
further wherein said eyepiece produces a distortion free image over a wide field of view when said immersed object surface is observed from an external viewing position.

2. The eyepiece of claim 1 comprising:
at least three said positive lens elements having said convex refracting surfaces with a sign of a radius of one of said convex refracting surfaces having an opposite sign of a radius of said remaining two convex refracting surfaces; and
one of said positive lens elements is an immersed positive lens element in contact with an image source device.

3. The eyepiece of claim 2 wherein said immersed positive lens element is a field lens.

4. The eyepiece of claim 2 wherein said plurality of said concave reflecting surfaces and said positive lens elements and said negative lens elements work as a magnifier to produce essentially zero distortion.

5. The eyepiece of claim 2 wherein said plurality of said concave reflecting surfaces and said positive lens elements and said negative lens elements work as a magnifier to produce less than 2% distortion.

6. The eyepiece of claim 1 wherein said plurality of said concave reflecting surfaces and said positive lens elements and said negative lens elements work as a magnifier to produce essentially zero distortion.

7. The eyepiece of claim 1 comprising:
at least one concave reflecting surface on a substrate which forms said negative lens element having dispersion that color corrects the remaining positive lens elements, forming a color corrected said magnifying eyepiece.

8. The eyepiece of claim 7 wherein said immersed convex lens element is a field lens.

9. The eyepiece of claim 7 wherein said plurality of reflective elements work as a magnifier to produce essentially zero distortion.

10. The eyepiece of claim 7 wherein said plurality of reflective elements that work as a magnifier to produce less than 2% distortion.

11. The eyepiece of claim 1 comprising:
at least one concave reflecting surface on a substrate that imparts little power when used as a lens element having at least three said positive lens elements having color correction by using additional lens elements in combination with said positive lens elements to achromatize said magnifying eyepiece.

12. The eyepiece of claim 11 wherein said immersed convex element is a field lens.

13. The eyepiece of claim 11 wherein said plurality of reflective elements work as a magnifier to produce essentially zero distortion.

14. The eyepiece of claim 11 wherein said plurality of reflective elements that work as a magnifier to produce less than 2% distortion.

15. The eyepiece of claim 1 comprising:
a plurality of refractive and reflective spherical surfaces forming said positive lens elements, said negative lens elements and sais concave reflecting surfaces that combine as a magnifier to produce a distortion free, less than 2%, image with optical correction over a wide field of view;
further comprising at least one said concave reflecting surface,
further comprising at least one said negative lens element;
further comprising at least three said positive lens elements with said three positive elements arranged such that a second side of a first said positive lens element is drawn from the left, convex;
that a first side of a second said positive lens element is drawn from the right, convex;
that a first side of said second said positive lens element is drawn from the right, convex; and
that a second side of a third said positive lens element is in contact with an image device.

16. The eyepiece of claim 1 comprising a field of view of at least 60 degrees.

17. The eyepiece of claim 1 comprising:
a concave reflecting element which is on a substrate that is a negative lens element by transmission with an index of refraction between $1.6<nd<2.0$ and a dispersion $15<vd<50$ used in combination with at least three positive refracting lens elements with less dispersive power than said negative lens element; and p1 further comprising of at least three said positive lens elements with said three positive lens elements arranged such that a second side of a first said positive lens element is drawn from the left, convex;
that a first side of a second said positive element is drawn from the right, convex;
that a first side of a third said positive element is drawn from the right, convex; and
that a second side of said third said positive lens element is in contact with an image device.

18. the optical magnifying eyepiece of claim 1 comprising:
refracting and reflecting surfaces arranged having at least one said reflecting surface being concave and three said refracting surfaces being convex wherein one of the said convex refracting surfaces has an opposite sign of said other convex refracting surfaces.

19. The optical magnifying eyepiece of claim 1 comprising:
a concave reflecting element on a substrate that is a negative lens element by transmission with an index of refraction $1.6<nd<2.0$ and a dispersion $15<Vd<50$ used in combination with at least three positive refracting elements with less dispersive power than said negative lens elements arranged;
wherein a second side of a first said positive element is drawn from the left, convex;

further wherein a first side of a second said positive element is drawn from the right, convex; and further wherein a first side of a third said positive element is drawn from a right direction, convex; and further wherein a second side of said third convex element is in contact with an image plane or an image plane cover plate.

* * * * *